United States Patent
De Lange et al.

(10) Patent No.: US 10,253,113 B2
(45) Date of Patent: *Apr. 9, 2019

(54) METHOD FOR ACTIVATION OF CHROMIUM CONTAINING CATALYST PRECURSOR FOR POLYMERIZATION AND THE RESULTING POLYMERIZATION CATALYST

(75) Inventors: Paulus De Lange, Wesseling (DE); Manfred Hecker, Neustadt Wied (DE)

(73) Assignee: Basell Polyolefine GmbH, Wesseling (DE)

( * ) Notice: Subject to any disclaimer, the term of this patent is extended or adjusted under 35 U.S.C. 154(b) by 729 days.

This patent is subject to a terminal disclaimer.

(21) Appl. No.: 13/990,618

(22) PCT Filed: Nov. 29, 2011

(86) PCT No.: PCT/EP2011/071248
§ 371 (c)(1),
(2), (4) Date: May 30, 2013

(87) PCT Pub. No.: WO2013/072618
PCT Pub. Date: Jun. 7, 2012

(65) Prior Publication Data
US 2013/0245209 A1    Sep. 19, 2013

Related U.S. Application Data

(60) Provisional application No. 61/424,145, filed on Dec. 17, 2010.

(30) Foreign Application Priority Data

Nov. 30, 2010  (EP) ..................................... 10015135

(51) Int. Cl.
| | |
|---|---|
| *C08F 4/24* | (2006.01) |
| *B01J 8/18* | (2006.01) |
| *B01J 8/22* | (2006.01) |
| *B01J 23/26* | (2006.01) |
| *B01J 38/32* | (2006.01) |
| *C08F 10/00* | (2006.01) |

(52) U.S. Cl.
CPC ............... *C08F 4/24* (2013.01); *B01J 8/1836* (2013.01); *B01J 8/22* (2013.01); *B01J 23/26* (2013.01);
(Continued)

(58) Field of Classification Search
CPC .. B01J 2219/00087; B01J 37/12; B01J 37/14; B01J 2204/00; B01J 2204/002;
(Continued)

(56) References Cited

U.S. PATENT DOCUMENTS

| 2,825,721 A | * | 3/1958 | Banks | ...................... | B01J 23/16 260/DIG. 25 |
| 2,987,487 A | * | 6/1961 | Stevens | .................. | B01J 8/1836 422/139 |

(Continued)

FOREIGN PATENT DOCUMENTS

| WO | WO 2004026919 A1 | 4/2004 |
| WO | WO 2009085104 A1 | 7/2009 |

OTHER PUBLICATIONS

Thomas, Charles E. Process Technology Equipment and Systems. 3rd Ed. Feb 4. 2010. pp. 168-169.*
(Continued)

*Primary Examiner* — Rip A Lee

(57) ABSTRACT

Method for activation of chromium containing catalyst precursor for polymerization and improved polymerization catalyst resulting The instant invention relates to an activation of a polymerization catalyst precursor by heat treatment comprising a support material and a catalyst precursor deposited thereon in a fluidized bed activator and to the use of the activated polymerization catalyst in the manufacture of polyolefins. The Method is performed in a cylindrical activator (1) arranged vertically comprising tubular activator walls, a fluidization gas inlet (2) near the bottom, a fluidization gas outlet (3) near the top and a heat exchange jacket
(Continued)

(4) outside the tubular activator walls, wherein the heating jacket covers the complete outer surface of the walls of the activator. The catalyst prepared by that method is improved with respect to its minor content of impurities and causes less interruptions during gas-phase polymerization or slurry polymerization either in stirred vessel or loop.

11 Claims, 2 Drawing Sheets

(52) U.S. Cl.
CPC ............... *B01J 38/32* (2013.01); *C08F 10/00* (2013.01); *B01J 2208/00212* (2013.01); *Y02P 20/584* (2015.11)

(58) Field of Classification Search
CPC .... B01J 2204/005; B01J 6/004; B01J 8/1818; B01J 8/1836; B01J 8/28; C08F 4/24; C08F 2/34
USPC .................................................. 422/139, 146
See application file for complete search history.

(56) References Cited

U.S. PATENT DOCUMENTS

| | | | | |
|---|---|---|---|---|
| 3,151,944 A * | 10/1964 | Stevens | .................. | B01J 8/1836 422/144 |
| 3,446,754 A * | 5/1969 | Solvik | .................... | B01J 8/1836 502/256 |
| 3,925,258 A * | 12/1975 | Cox | .......................... | B01J 23/26 502/319 |
| 4,022,580 A * | 5/1977 | Rush | ........................ | B01J 37/14 34/576 |
| 4,076,946 A * | 2/1978 | Millick, III | ............. | C07C 67/60 560/78 |
| 4,224,189 A * | 9/1980 | Scholten | ................ | B01J 20/103 423/336 |
| 5,895,770 A * | 4/1999 | Pullukat | .................... | B01J 21/08 502/103 |
| 6,683,022 B1 * | 1/2004 | De Lange et al. | ............ | 502/305 |
| 7,232,551 B1 | 6/2007 | Lange et al. | | |
| 8,258,246 B2 * | 9/2012 | McCormick | .......... | C08F 210/16 526/106 |
| 2004/0052692 A1 * | 3/2004 | Hottovy | ..................... | B01J 8/44 422/143 |
| 2007/0207068 A1 | 9/2007 | Lange et al. | | |
| 2010/0279858 A1 * | 11/2010 | Walworth | ................ | B01J 23/26 502/319 |
| 2011/0201768 A1 * | 8/2011 | Benham | ................... | B01J 23/26 526/90 |

OTHER PUBLICATIONS

PCT International Search Report & Written Opinion dated Jan. 16, 2012, for PCT/EP2011/071248.

\* cited by examiner

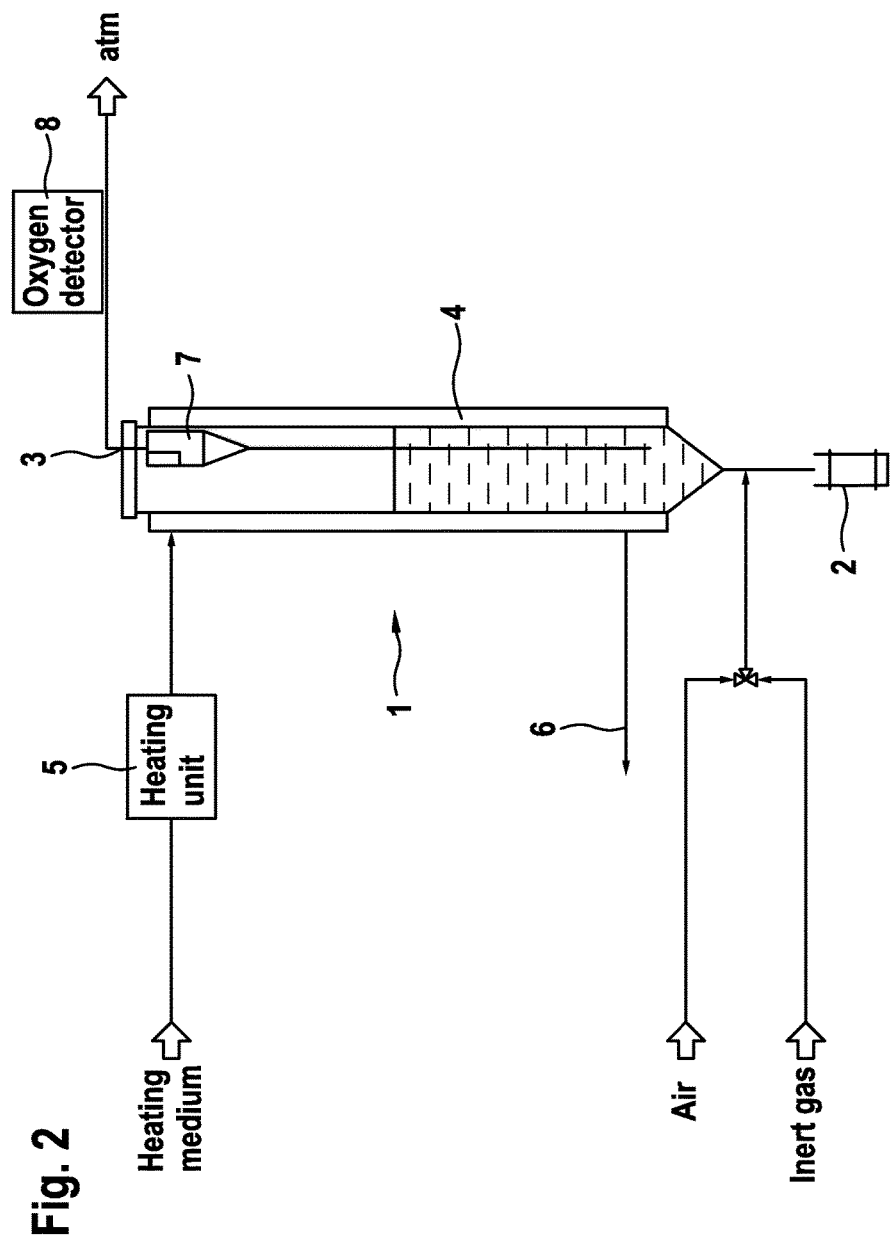

METHOD FOR ACTIVATION OF CHROMIUM CONTAINING CATALYST PRECURSOR FOR POLYMERIZATION AND THE RESULTING POLYMERIZATION CATALYST

This application is the U.S. National Phase of PCT International Application PCT/EP2011/071248, filed Nov. 29, 2011, claiming priority of European Patent Application No. 10015135.6, filed Nov. 30, 2010 and the benefit under 35 U.S.C. 119(e) of U.S. Provisional Application No. 61/424,145, filed Dec. 17, 2010, the contents of which are incorporated herein by reference in their entirety.

The present invention relates to an activation of a polymerization catalyst precursor by heat treatment comprising a support material and a catalyst precursor deposited thereon in a fluidized bed reactor and to the use of the activated polymerization catalyst in the manufacture of polyolefins.

Fluidized bed treatment is known in the art and described e.g. in EP 1 133 351. When gases flow in a vertical direction from below through a bed of finely particulate material supported on perforated plates arranged horizontally, a state similar to that of a boiling liquid becomes established under certain flow conditions, the bed throws up bubbles, and the partie/es of the bed material are in constant swirling up and down motion within the bed and thus remain suspended to a certain extent. For this situation, the term fluidized bed is used.

Such a state arises when a certain limiting value for the velocity of the gas flowing through the bed from below against the gravity of the solid particles is approached. This point, at which the resting bed becomes a swirling bed, the fixed bed becomes a fluidized bed, is referred to as the whirl or fluidizing point. The reaching of this point depends on a number of physical factors; these are, for example, the density, size, distribution and shape of the particles and the properties of the fluidizing liquid.

Prominent examples for methods which can be designed as fluidized-bed methods are the following:

Gas-phase polymerization, coal combustion, coal liquefaction and Fischer-Tropsch synthesis, catalytic cracking of hydrocarbons, roasting of sulfidic ores, calcination of hydrated aluminia, calcination of limestone, desulfurization of gases, catalytic dehydrogenation of benzene-rich naphthene fractions, distillation of oil from bituminous sand and several others more like incineration of waste, garbage, special waste and sewage sludge, or physical processes, such as separation of small partie/es or mixing.

For the purposes of the instant invention, the term catalyst is preferably used for a supported catalyst. For the purposes of the invention, a supported catalyst shall mean a catalyst system comprising a support, at least one transition metal and/or at least one compound of a transition metal and, if appropriate, one or more activators.

For the activation of polymerization catalyst precursors, especially for use thereof in the polymerization of olefins, the final step in preparing the Cr-catalyst is made in the fluidized-bed reactor from here on referred to as "activator". Thereby the particles are moved by an upwardly directed gas stream with which they are in intense material and heat exchange. During such heat treatment in the presence of air and therewith of oxygen, the particles undergo a physical/chemical change inasmuch, as the precursor comprising a Cr(III) salt, if desired in combination with other metal ions like titanium or zirconium, and additives, either gaseous, liquid or solid, such as ammonium hexafluorisilicate, is transformed into the stable Cr(VI) oxidation level which is fixed and thereby stabilized on the carrier by means of oxygen bridges.

As soon as the conversion is complete, the particles are allowed to cooled down to ambient temperature. During the cooling down phase the remaining air is usually removed from the reactor via flushing and replaced by an inert gas, like nitrogen or a noble gas like helium or argon.

As a difficult technical problem, impurifications have been observed in the polymer prepared in the presence of the catalyst, which did occur in the form of green-blue particles having a size of several mm diameters. Such particles are difficult to separate from the polymer and they have been the reason for technical problems during production leading to interruptions of the continuous production process and thereby resulting into higher costs. As long as they are present in the end product they have been responsible for a considerable loss in quality, not only concerning the optical appearance but also in mechanical properties.

Analysis of the undesired particles revealed that they do mainly comprise $Cr_2O_3$. Such compound was supposed to have been removed from the catalyst during the oxygenation by heat treatment and it was surprising that it did again appear in the end product.

The technical problem of the instant invention was therefore to find a way to avoid such impurities in the preparation of Cr-containing polymerization catalyst, which way needs only slight changes in the existing machine equipment, whereby a high quality catalyst should result from that preparation, which does not comprise any impurities any longer.

The instant invention therefore pertains to a method for the preparation of a Cr-containing polymerization catalyst comprising a fluidized-bed method for the activation of the chromium containing catalyst precursor by heat treatment, wherein the heat treatment is performed in the presence of oxygen at a temperature in the range of from 300 to 1000° C. over a time period of from 0.5 to 48 h in an activator having an inner activator chamber surrounded by metallic walls, whereby the activator comprises on the outer surface of the activator walls a heating jacket covering the complete outer surface of the activator walls.

The heating jacket may be designed as a single heating jacket using steam or combustion gases as heating medium or electric power. However, in an improved embodiment of the invention, a double heating jacket may be employed, whereby a combined heating using electrical power in combination with another heating medium will become available.

In a further preferred embodiment of the invention, the supply of the heating medium to the heating jacket is arranged on top of the activator and the outlet of the heating medium is arranged downwards, near the bottom of the activator.

By the method of the instant invention, the upper part of the activator is heated first preventing thereby that any condensation of residual liquid from the reaction mix located in the lower part of the activator will occur in the upper part of the activator. Thereby it is excluded, that any condensed liquids fall down in the activator chamber and cause the creation of impurities in the catalyst during its treatment.

During the method of the instant invention, air is used as an oxygen source to oxidize Cr(III) to Cr(VI). However, other oxygen sources may also be used in addition to approach a higher oxygen concentration inside the activator.

As support material for the chromium containing catalyst precursor, aluminum oxides, silicon dioxides (silicagel), titanium dioxides, zirconium dioxides or mixed oxides or cogeles of these are suitable. Additional useful support materials may be received by modification of the pore structure, for instance with compounds of the elements bor, aluminum, silicon, phosphor or fluorine. Preferably used is a silicagel or silica cogel with oxides of Mg, Ca, B, Al, P, Ti, V, Zr and/or Zn. Preferred support materials are spherical or granular silicagels, whereby these are preferably available by spray drying.

Useful support material has preferably a specific surface in the range of from 10 to 1000 $m^2/g$, a pore volume in the range of from 0.1 bis 5 ml/g and a mean particle diameter of from 1 bis 500 µm. Preferred support material has a specific surface in the range of from 50 bis 700 $m^2/g$, a pore volume in the range of from 0.4 and 3.5 ml/g and a mean particle diameter in the range of from 5 bis 350 µm.

The method of the instant invention, is preferably performed in a cylindrical activator arranged vertically comprising tubular activator walls, a fluidization gas inlet near the bottom, a fluidization gas outlet near the top and a heat exchange jacket outside the tubular activator walls.

At the fluidization gas outlet of the activator, the gas is passed through a suitable separator, by means of which entrained particles are removed in order to keep them in the reactor. Such separators can be filter elements suspended directly inside on top of the activator. The disadvantage of these filter elements is that they become blocked and therefore must be cleaned or replaced regularly.

It is advantageous to use a cyclone separator, which is essentially maintenance-free and, in contrast to a filter, has the ability to allow very fine particles to leave the reactor.

Relatively fine particles are removed and/or relatively large particles are retained by means of a cyclone separator which is known in the art.

When the activation is complete, the catalyst has to be stored under oxygen free inert gas atmosphere, preferably under nitrogen atmosphere or noble gas like He or Ar or other inert gases.

BRIEF DESCRIPTION OF THE DRAWINGS

FIG. 1 shows how the temperature of the reactor goes up to the temperature of treatment and then is kept at that temperature for the whole time period for treatment. After the time period for treatment, the temperature goes down, whereby the oxygen is replaced by nitrogen.

FIG. 2 shows schematically a cut through an activator with an outer heating jacket suitable for the method of the present invention.

FIG. 2 shows the cylindrical activator (1) arranged vertically comprising an inner activator chamber surrounded by tubular activator walls. A fluidization gas inlet (2) is arranged at the bottom of the activator (1) and a fluidization gas outlet (3) is arranged near the top of the activator (1). Also the heat exchange jacket (4) is to see covering the complete outer surface of the tubular activator walls. The heating jacket (4) comprises a heating medium inlet (5) on top and a heating medium outlet (6) at the bottom. A cyclone (7) is arranged in the upper part of the activator (1) inside the chamber.

Figure 1:
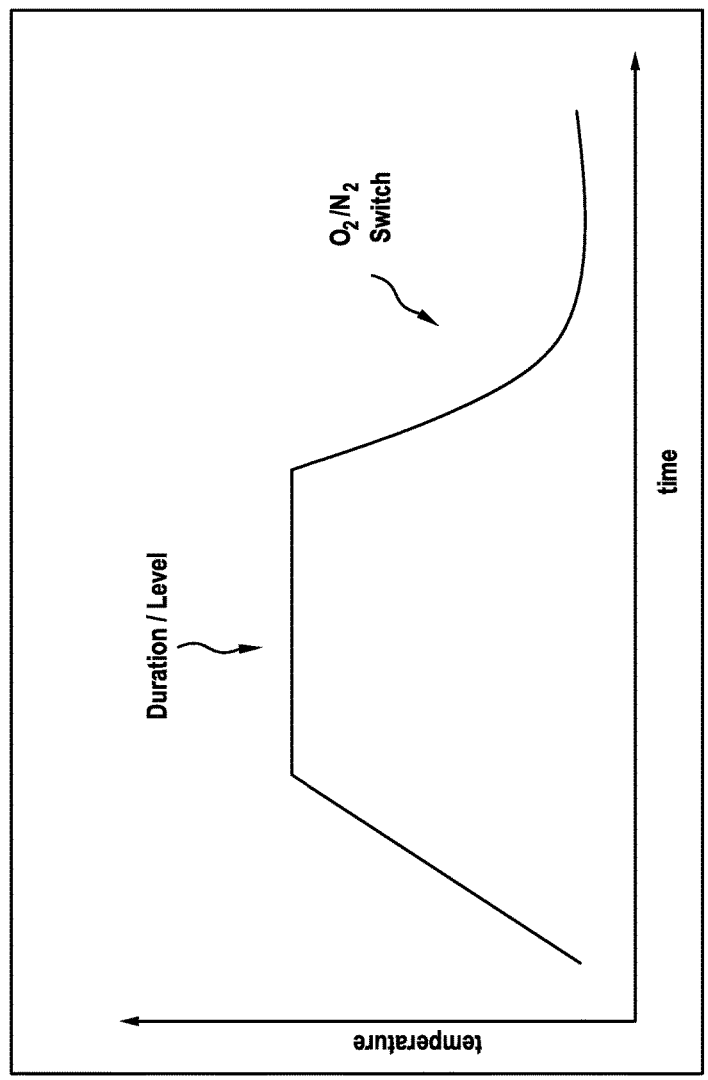
FIG. 1 shows a temperature/time diagram illustration the method of the instant invention.

A further advantage of the reactor suitable for the instant invention is that the separator used can advantageously be a cyclone, i.e. effective and reliable discharge of very fine material is facilitated without having to accept material losses due to material discharge during the fluidisation process. The disadvantages of the filter elements employed in the processes usually used, which are located in the fluidization gas outlet (3), have been described in the introduction. The cyclone (7) separator used in all cases serves to remove very fine particles and to retain the catalyst in the reactor.

The catalyst prepared by the process according to the invention is employed, in particular, in the polymerization of olefins. For that purpose, the catalyst is generally fed to a polymerization reactor in the form of solid particles. The active components used are chromium or titanium, preferably chromium. Examples of support materials have been mentioned before in terms of their chemical composition, their pore volume and the particle diameters. Further possible support materials are fluorinated silica, fluorinated alumina, fluorinated silica-alumina, boron oxides or mixtures thereof.

The catalyst prepared by the method according to the invention is employed, in particular, in the polymerization of ethylene or in the copolymerization of ethylene with other 1-olefins having from 3 to 10 carbon atoms, preferably with propylene, 1-butene or 1-hexene. Such polymerization may be performed in gas-phase or slurry, whereby for the slurry polymerization stirred vessel reactors or loop reactors are very useful.

During the activation, in addition to the fluidization gas introduced through the fluidization gas inlet (2), additional gases and, in addition to the originally introduced particles of catalyst precursor, additional solid can also be introduced into the fluidized bed. This introduction can take place at any time during the process and through feed points installed at any desired locations. Examples of suitable additional gases are oxygen, carbon dioxide or steam, while examples of additional solids which can be employed are ammonium hexafluorosilicate, untreated support material or catalysts having a different physical/chemical structure. In addition, liquids, for example water, can be sprayed into the fluidized bed. Thus, liquids, additional solids and/or additional gases can also be introduced into the activator.

The treatment by the method according to the invention is described in greater detail below by means of the working examples.

WORKING EXAMPLE 1

400 kg of a catalyst precursor having a bulk density of 250 $kg/m^3$ and a chromium content of 0.3 wt.-% were activated in a steel activator having an overall height of 8 m and a cylindrical diameter of 1 m. The outer heating jacket was covering the full length of the activator.

The activator was heated from ambient temperature to 630° C. and kept there for 10 hours, with air being used as fluidizing gas and as oxidizing agent. Thereafter the activator was allowed to cool down. During the cooling phase the fluidizing gas was switched to nitrogen at 300° C. After the end of the process, the fluidizing gas was turned off and the catalyst was discharged.

COMPARATIVE EXAMPLE 125 kg of a catalyst precursor having a bulk density of 250 $kg/m^3$ and a chromium content of 0.3 wt.-% were activated in a steel activator having an overall height of 8.5 m and a cylindrical diameter of 0.6 m. The outer heating jacket was covering only the lower half of the full length of the activator.

The activator was heated from ambient temperature to 630° C. and kept there for 10 hours, with air being used as fluidizing gas and as oxidizing agent. Thereafter the activator was allowed to cool down. During the cooling phase the fluidizing gas was switched to nitrogen at 300° C. After the end of the process, the fluidizing gas was turned off and the catalyst was discharged.

Polymerization

Subsequent polymerization of ethylene in a gasphase reactor in the presence of catalyst produced according the examples were evaluated. The settings for the gas phase polymerization were 20 bars pressure, 112° C. temperature with a cyclegas composition of 57 vol.-% ethylene, 0.45 vol.-% 1-hexene, 5 vol.-% n-hexane and nitrogen as the rest. The throughput in both cases was 25 t/h.

With the catalyst prepared according to working example 1 steady production without any disturbances whatsoever did occur. The quality of polyethylene produced was always within the specification and accordingly never poor film notes due to catalyst residues could be observed.

With catalysts prepared according the comparative example regularly dosing problems (upto blocked dosing lines) did occur due to small solid particles encountered. The film notes of the products were worse since catalyst residues (analysis revealed always $Cr_2O_3$) were continuously present.

What is claimed is:

1. A method for preparing a Cr-containing polymerization catalyst comprising:

heat-treating a reaction mixture, wherein the reaction mixture comprises a chromium containing catalyst precursor and residual liquid in a fluidized bed, wherein the chromium catalyst precursor comprises a support material, wherein the heat-treating step is performed in an activator in the presence of oxygen at a temperature in the range of from 300 to 1000° C. over a time period of from 0.5 to 48 hours, wherein the activator has an inner activator chamber surrounded by generally-vertically shaped metallic walls having an inner surface and an outer surface, a fluidization gas inlet near the bottom portion of the activator, and a fluidization gas outlet near the top portion of the activator, the outer surface of the metallic walls are completely covered by a heating jacket, and the heating jacket has a heating medium inlet and a heating medium outlet, and feeding a heating medium to the heating medium inlet of the heating jacket, wherein the heating medium inlet is near the top portion of the activator, and recovering the heating medium from the heating medium outlet of the heating jacket, wherein the heating medium outlet is near the bottom portion of the activator.

2. The method of claim 1, wherein the heating jacket is a double heating jacket.

3. The method of claim 1, wherein the resulting Cr-containing polymerization catalyst does not comprise $Cr_2O_3$.

4. The method of claim 3, wherein the Cr-containing polymerization catalyst is used in a gas-phase polymerization or a slurry polymerization in a stirred vessel or loop reactor.

5. The method of claim 4, further comprising a step of polymerizing olefins in a gas-phase or a slurry polymerization process.

6. The method of claim 5, wherein the olefins are selected from the group consisting of ethylene, propylene, butene, pentene, hexene and mixtures thereof.

7. The method of claim 1, wherein fluidization gas is fed to the fluidization gas inlet in a gaseous state, the fluidization gas flows up to the fluidization gas outlet, and the fluidization gas remains in the gaseous state while in the activator.

8. The method of claim 7, wherein the activator is free of residual liquid.

9. The method of claim 7, wherein the fluidization gas is air.

10. The method of claim 7, wherein the resulting Cr-containing polymerization catalyst does not comprise $Cr_2O_3$.

11. The method of claim 9, wherein air is used to oxidize Cr(III) to Cr(VI).

* * * * *

UNITED STATES PATENT AND TRADEMARK OFFICE
CERTIFICATE OF CORRECTION

PATENT NO. : 10,253,113 B2
APPLICATION NO. : 13/990618
DATED : April 9, 2019
INVENTOR(S) : De Lange et al.

It is certified that error appears in the above-identified patent and that said Letters Patent is hereby corrected as shown below:

On the Title Page

Item (57), Line 8, delete "Method" and insert -- method --, therefor

In the Specification

In Column 1, Line 67, delete "hexafluorisilicate," and insert -- hexafluorosilicate, --, therefor
In Column 2, Line 5, delete "cooled" and insert -- cool --, therefor Signed and Sealed this
Twenty-eighth Day of June, 2022

Katherine Kelly Vidal
*Director of the United States Patent and Trademark Office*